US012739461B1

(12) United States Patent
Wang et al.

(10) Patent No.: US 12,739,461 B1
(45) Date of Patent: Sep. 15, 2026

(54) TECHNIQUES FOR ESTIMATING VIDEO COMPLEXITY

(71) Applicant: Amazon Technologies, Inc., Seattle, WA (US)

(72) Inventors: Qi Keith Wang, Cambridge (GB); Stephen John Bannister, Burwell (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/965,485

(22) Filed: Dec. 2, 2024

(51) Int. Cl.
*H04N 21/2662* (2011.01)
*G06T 7/20* (2017.01)
*H04N 19/172* (2014.01)

(52) U.S. Cl.
CPC ........... *H04N 21/2662* (2013.01); *G06T 7/20* (2013.01); *H04N 19/172* (2014.11)

(58) Field of Classification Search
CPC ..... H04N 21/2662; H04N 19/172; G06T 7/20
See application file for complete search history.

(56) References Cited

U.S. PATENT DOCUMENTS 6,002,394 A * 12/1999 Schein ................. H04N 7/0884 348/E7.024
6,177,931 B1 * 1/2001 Alexander ....... H04N 21/42204 348/E7.071
7,992,161 B2 * 8/2011 Meadows .......... H04N 21/6582 725/23
8,713,603 B2 * 4/2014 Kilar .................. H04N 7/17318 725/32
9,100,683 B2 * 8/2015 Bhogal .............. H04N 21/4436
10,070,193 B2 * 9/2018 Newman .............. H04N 21/812
10,341,670 B1 * 7/2019 Brailovskiy ......... H04N 19/146
10,701,452 B2 * 6/2020 Newman ............ H04N 21/4828
10,887,642 B1 * 1/2021 Shams ............... H04N 21/2662
10,958,947 B1 * 3/2021 Wei ...................... H04N 21/236
11,019,349 B2 * 5/2021 Liu ...................... H04N 19/134
11,394,620 B1 * 7/2022 Brailovskiy ........ H04L 41/5009
11,843,784 B2 * 12/2023 Tanner ................... H04N 19/30
12,088,821 B1 * 9/2024 Waggoner ............ H04N 19/124
2002/0174430 A1 * 11/2002 Ellis .................. H04N 21/4753 386/230
2003/0120541 A1 * 6/2003 Siann ..................... G06Q 30/02 705/14.69

(Continued)

*Primary Examiner* — Michael B. Pierorazio
(74) *Attorney, Agent, or Firm* — Kilpatrick Townsend & Stockton LLP

(57) ABSTRACT

Video scene complexity can be estimated at a camera in real time. The camera may store associations between video complexity score ranges and corresponding bitrate values and between maximum key frame sizes and corresponding compression parameter values. As video is captured, a compression parameter value, a size of a compressed key frame, and a maximum key frame size associated with the compression parameter value can be used to estimate spatial complexity (e.g., a degree of detail within the video). The number of predicted frames corresponding to the key frame can be used to estimate temporal complexity (e.g., an amount of motion within the video). A video complexity score can be calculated from these spatial and temporal complexity estimations and used to select a bitrate for subsequent video transmissions, enabling improved bandwidth usage and storage planning while maintaining video quality.

18 Claims, 10 Drawing Sheets

(56) References Cited

U.S. PATENT DOCUMENTS

2003/0149618 A1* 8/2003 Sender ............... G06Q 30/0277 705/26.1
2003/0149975 A1* 8/2003 Eldering ............ H04N 21/4532 348/E7.071
2004/0255322 A1* 12/2004 Meadows .......... H04N 21/2543 725/23
2005/0132398 A1* 6/2005 Baran .................... G06Q 30/04 348/E7.071
2006/0048184 A1* 3/2006 Poslinski ........... H04N 21/4542 348/E5.112
2006/0253417 A1* 11/2006 Brownrigg .......... G06F 16/9535
2007/0104456 A1* 5/2007 Craner ............. H04N 21/44231 348/E5.112
2007/0157237 A1* 7/2007 Cordray ................. H04N 21/47 725/89
2007/0174336 A1* 7/2007 Day ................... H04N 21/4583 348/E7.071
2008/0022298 A1* 1/2008 Cavicchia .......... H04N 21/4524 725/112
2008/0115161 A1* 5/2008 Kurzion ................. G06Q 30/02 725/62
2008/0187279 A1* 8/2008 Gilley .............. H04N 21/43615 386/250
2008/0221986 A1* 9/2008 Soicher .............. G06Q 30/0277 705/14.56
2008/0235587 A1* 9/2008 Heie ...................... H04N 7/142 709/231
2008/0235733 A1* 9/2008 Heie .................... H04N 21/482 725/46
2008/0271078 A1* 10/2008 Gossweiler ............ H04N 21/47 725/40
2009/0217316 A1* 8/2009 Gupta ................... H04L 65/762 705/14.66
2009/0304361 A1* 12/2009 Chan .................. H04N 21/4147 386/356
2009/0310937 A1* 12/2009 Ellis ................... H04N 21/4331 386/239
2010/0031162 A1* 2/2010 Wiser ................... H04N 21/431 715/747
2010/0186025 A1* 7/2010 Thomas ............... H04N 21/482 725/96
2010/0247067 A1* 9/2010 Gratton .............. H04N 21/4325 386/291
2011/0047569 A1* 2/2011 Mears .................. H04N 21/426 725/38
2011/0138053 A1* 6/2011 Khan ...................... G06F 9/505 709/226
2011/0179453 A1* 7/2011 Poniatowski ........... G06F 16/78 725/58
2011/0307929 A1* 12/2011 Youssefmir ........ H04N 21/2402 725/89
2012/0066371 A1* 3/2012 Patel ................... H04L 67/1031 709/224
2012/0110620 A1* 5/2012 Kilar .................... H04N 21/812 725/34
2012/0117103 A1* 5/2012 Farrelly .................. H04L 67/10 707/769
2012/0117339 A1* 5/2012 Kandekar ............... G06F 16/13 711/159
2012/0284745 A1* 11/2012 Strong ................. H04N 21/812 725/34
2013/0133009 A1* 5/2013 Bhogal .............. H04N 21/4147 725/58
2013/0139196 A1* 5/2013 Sokolov ............. H04N 21/6175 725/25
2013/0219435 A1* 8/2013 Pattison ................... H04N 7/20 348/731
2016/0234078 A1* 8/2016 Jana ........................ H04L 47/25
2016/0301964 A1* 10/2016 Laliberte ............ G06Q 30/0207
2016/0323643 A1* 11/2016 Panchaksharaiah ......................... H04N 21/4753
2018/0176622 A1* 6/2018 Sheppard ............. H04N 21/252
2018/0213243 A1* 7/2018 Liu ........................ H04N 19/40
2019/0246138 A1* 8/2019 Terterov ................. H04N 19/14
2019/0313161 A1* 10/2019 Wilms ............... H04N 21/8456
2021/0093960 A1* 4/2021 Cerny .................. H04N 19/146
2021/0366158 A1* 11/2021 Sugio ..................... H04N 19/17
2021/0409724 A1* 12/2021 Huang ................... H04N 19/30
2022/0060716 A1* 2/2022 Han ........................ H04N 19/14
2022/0377359 A1* 11/2022 Zhou .................... H04N 19/147
2023/0088688 A1* 3/2023 Grois ...................... H04L 65/70 709/231
2023/0396787 A1* 12/2023 Jiang .................... H04N 19/172

* cited by examiner

400

402 404 405 408 410

| | 22 | 28 | 30 | 33 | 38 | 45 |
|---|---|---|---|---|---|---|
| Backyard | 314097 | 174630 | 143228 | 100295 | 52112 | 17080 |
| Simple | 69122 | 24219 | 17557 | 10941 | 6358 | 3646 |
| Door | 122160 | 55823 | 44779 | 30522 | 16875 | 7737 |
| Doorbell | 164110 | 89341 | 73559 | 52627 | 30351 | 13121 |
| Dusk | 171388 | 80123 | 64495 | 43228 | 24506 | 11001 |
| Garage | 217892 | 93373 | 74537 | 48443 | 27296 | 12669 |
| Front yard | 226475 | 58387 | 38163 | 21170 | 9115 | 4236 |
| Mixed light | 122516 | 67534 | 56215 | 40792 | 24412 | 11482 |
| Outdoors | 549230 | 328043 | 276677 | 201147 | 115050 | 42537 |
| Shop | 269008 | 156925 | 131543 | 96289 | 56806 | 24006 |

406

412

| QP | Max Frame Size |
|---|---|
| 22 | 549,230 |
| 28 | 328,043 |
| 30 | 276,677 |
| 33 | 201,147 |
| 38 | 115,050 |
| 45 | 42,537 |

| | 28 | 30 | 32 | 38 |
|---|---|---|---|---|
| Backyard | 53.23 | 51.77 | 50.42 | 45.30 |
| Simple | 7.38 | 6.35 | 5.68 | 5.53 |
| Door | 17.02 | 16.18 | 15.46 | 14.67 |
| Doorbell | 27.23 | 26.59 | 26.22 | 26.38 |
| Dusk | 24.42 | 23.31 | 22.07 | 21.3 |
| Garage | 28.46 | 26.94 | 25.03 | 23.73 |
| Front yard | 17.80 | 13.79 | 11.37 | 7.92 |
| Mixed light | 20.59 | 20.32 | 20.25 | 21.22 |
| Outdoors | 100.00 | 100.00 | 100.00 | 100.00 |
| Shop | 47.84 | 47.54 | 47.71 | 49.38 |

| | TC Score |
|---|---|
| Backyard | 72 |
| Simple | 59 |
| Door | 68 |
| Doorbell | 64 |
| Dusk | 75 |
| Garage | 76 |
| Front yard | 52 |
| Mixed light | 32 |
| Outdoors | 21 |
| Shop | 93 |

| | SC | TC | VC |
|---|---|---|---|
| Backyard | 51.8 | 72 | 60 |
| Door | 16.2 | 68 | 37 |
| Doorbell | 26.6 | 64 | 42 |
| Garage | 26.9 | 75 | 46 |
| Shop | 47.5 | 21 | 37 |
| ... | ... | ... | ... |

| VC Score Range | Bitrate (mbps) |
|---|---|
| 1-10 | 1.0 |
| 11-50 | 1.5 |
| 51-75 | 2.0 |
| 76-100 | 2.5 |

1000

TECHNIQUES FOR ESTIMATING VIDEO COMPLEXITY

BACKGROUND

Video streaming devices (e.g., security cameras) stream billions of videos every day. These videos utilize a staggering and ever increasing amount of cloud storage. The video encoding provided by these cameras is largely scene dependent. That is, scenes (e.g., the environment depicted in the images captured by the camera) with relatively fine detail such as trees, leaves, and grass and/or scenes that include a relatively high degree of motion (collectively referred to as "complex scenes") are more difficult to encode with good video quality than scenes with less detail and/or relatively little motion (collectively referred to as "simple scenes"). Complex scenes require more bits/bytes to encode than simple scenes with the same amount of compression. As a result, a higher bitrate is needed to transmit a complex scene than the bitrate needed to transmit a simple scene given the same amount of time. It would be beneficial to adjust the bitrate used by the camera based on the relative complexity of the scene being captured. However, a camera provider does not know ahead of time the complexity of the video that a given camera will capture. Video complexity can only be ascertained after the camera is installed. Moreover, video streaming devices lack the processing resources needed to estimate complexity using conventional estimation methods, and latency issues would be incurred if other devices with adequate processing power were employed to perform these calculations.

Conventionally, camera providers often set each camera to transmit at a relatively high bitrate to guarantee quality video in all scenarios. However, many cameras capture scenes that are not complex and for which a high bitrate is not necessary. Therefore, these conventional approaches result in suboptimal bitrate and bandwidth usage.

BRIEF DESCRIPTION OF THE DRAWINGS

Various embodiments in accordance with the present disclosure will be described with reference to the drawings, in which:

FIG. 4 depicts a number of exemplary tables/mappings related to maintaining relationships between quantization parameter values and corresponding frame sizes, in accordance with at least one embodiment;

FIG. 5 illustrates an exemplary table/mapping depicting associations between spatial complexity scores for a set of images that have been compressed using a variety of quantization parameter values, in accordance with at least one embodiment;

FIG. 6 illustrates an exemplary table/mapping that depicts various temporal complexity scores for respective groups of frames corresponding to the key frames identified in the tables of FIGS. 4 and 5, in accordance with at least one embodiment;

DETAILED DESCRIPTION

Figure 1:
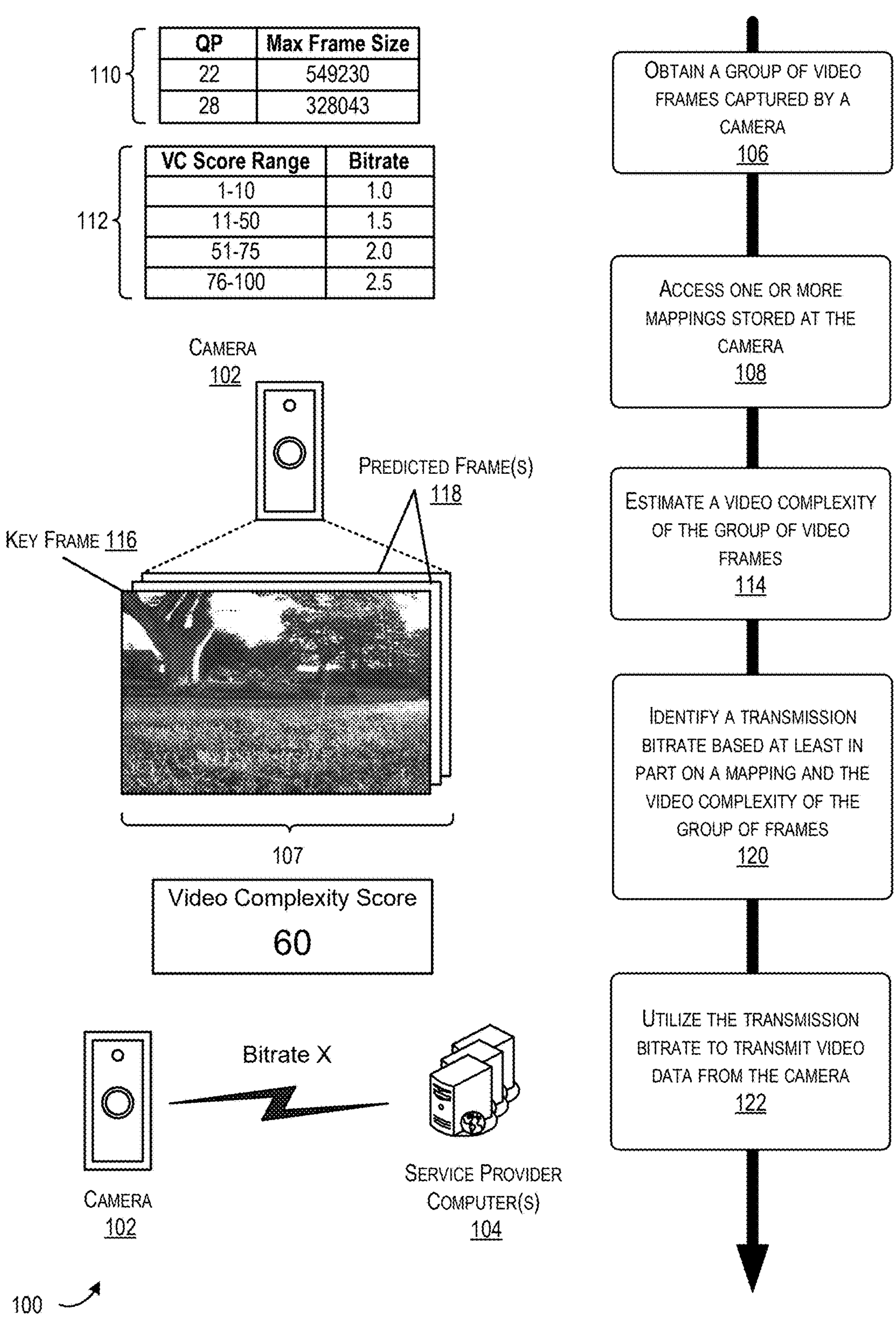
FIG. 1 is a flow diagram illustrating an exemplary method for selecting the bitrate utilized by a camera, in accordance with at least one embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to reducing the computational burden of estimating video complexity, enabling these estimations to be performed at devices with relatively weak processing power (e.g., video cameras, security cameras, etc.). These devices may be configured to stream video to a service provider that provides cloud storage. Conventionally, video complexity estimation algorithms (e.g., discrete cosine transform, and the like) utilize deep analysis and intensive computations which are not suitable for devices that lack a sufficiently powerful application-specific integrated circuit (ASIC) and/or central processing unit (CPU). Additionally, camera providers generally have no prior knowledge of the complexity of the video these devices will eventually capture. As a result, the camera providers often configure the cameras to stream videos at a bitrate that utilizes all of the available bandwidth regardless of the complexity of the captured scene. For example, a camera may be set to utilize a 2.5 megabit per second bitrate for High-Definition (HD), 1080p video at 25 frames per second.

However, video encoding heavily depends on the complexity of the video. At the same bitrate, some video frames may be coded with superior quality, while others are coded with poor quality. Videos including frames that are spatially complex (e.g., that have a high degree of detail such as leaves, grass blades, and the like) and/or that include a sizeable amount of motion (referred to as "temporal complexity") are harder to code with good video quality than videos that have less details and/or less motion.

Service providers (e.g., cloud providers) may provide cloud storage for these types of cameras. In some cases, the service provider may be the same entity that provides the camera. Using a static and potentially inflated bitrate for streaming wastes bandwidth and causes the storage requirements for subsequent video to be difficult to predict. As a result, the cloud provider may waste resources unnecessarily scaling cloud storage.

Unlike conventional systems that utilize a static bitrate, the disclosed techniques enable a camera to estimate, in real time (e.g., without significant delay, sufficiently quickly to affect the encoding and/or streaming operations of the camera instantly), the complexity of the video it has captured and adjust the bitrate it utilizes to stream the video, using higher bitrates for relatively complex video and lower bitrates for less complex video. In some embodiments, the service provider can similarly estimate video complexity and instruct the camera to utilize a specific bitrate. The disclosed methods for estimating the video complexity of a group of pictures (GOP) (also referred to as a "group of video frames) involve light weight computations, requiring significantly less processing resources than conventional methods. A "group of pictures" refers to a collection of successive pictures within a coded video stream from which visible frames are generated. In video coding, the group of pictures specifies the order/arrangement of intra-frames (e.g., pictures that are coded independently of all other pictures, referred to as an "I frame" or "key frame") and inter-frames (e.g., pictures that are coded as differences relative to previous pictures in the sequence, referred to as "predictive frames" or "p frames," for brevity) of the group. The ability to adjust bitrate based on video complexity may also alleviate wasteful storage use, saving storage that was conventionally unnecessarily utilized even for less complex video.

As an example, mappings (e.g., tables) that provide a number of values needed for calculating the complexity of a video may be stored at the camera. A group of video frames may be obtained from video recorded by the camera. The camera may be configured to select an amount of compression to apply to the video to reduce the size of the video in preparation to stream it to a service provider. Using values obtained by the mapping and the amount of compression utilized by the camera, calculations can be performed by the camera to determine a degree of detail included in a video frame and an amount of motion depicted within the group of video frames. Once known, the degree of detail and the amount of motion may be used as parameters to calculate the overall complexity of the video. The camera may be configured to adjust its bitrate (e.g., the amount of data it processes and/or transmits in a video stream over a unit of time, such as one second) based on the complexity identified for the video. These adjustments ensure that the camera is not processing and/or streaming more data than is needed to ensure good video quality.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1, that illustrates an exemplary method 100 for selecting the bitrate utilized by a camera (e.g., camera 102), in accordance with at least one embodiment. The operations of method 100 may be performed by a "video capture device," an example of which includes the camera 102. In some embodiments, the camera 102 may be a video doorbell device or another type of security camera that is configured to record video and stream or otherwise transmit captured video to a remote system (e.g., service provider computer(s) 104). A greater or fewer number of operations than the number depicted in FIG. 1 may be utilized and the operations may be performed in any suitable order, not necessarily the order provided in FIG. 1.

The method 100 may begin at 106, where a group of video frames 107 (also referred to as "group of pictures" (GOP)) are obtained. In some embodiments, the group of video frames 107 may be obtained from recorded video that has been captured by camera 102. In some embodiments, the group of video frames 107 may correspond to the most-recent video frames captured/recorded by the camera 102. Camera 102 may be configured to stream or otherwise transmit video to service provider computer(s) 104. Service provider computer(s) 104 may be configured to provide storage (e.g., cloud-based storage) for the streamed video enabling a user (e.g., an owner or operator of camera 102) to access the video in near real time (e.g., without significant delay after the camera 102 has captured the video, sufficiently quickly such that the user may view the environment as it existed a few seconds ago or less, etc.). The user may additionally or alternatively opt to view the video at any suitable time after storage. In some embodiments, the camera 102 may be one of a fleet of deployed cameras that individually stream captured video to service provider computer(s) 104 for storage.

At 108, one or more mappings may be accessed from local storage of the camera 102. These mappings (e.g., mapping 110 and mapping 112) may be previously generated by service provider computer(s) 104 and transmitted to the camera 102 where the mappings may be stored in local memory (e.g., memory of the device). Mapping 110 may include mappings/associations between quantization parameter values and respective max frame sizes. A "quantization parameter value" may be selected by an encoder of the camera 102 and may be used to control the amount of compression that is used to encode video frames, or, in other words, to control how much spatial detail is preserved during video compression. Mapping 112 may include mappings/associations between video complexity score ranges and a respective bitrates to be used by the camera 102.

At 114, a processor of the camera 102 may execute operations to estimate a video complexity of the group of video frames 107. The complexity of the video may depend on the spatial complexity of one or more frame(s) of the video and a temporal complexity of one or more frames of the video. "Spatial complexity" refers to a level of detail depicted within a frame. A frame having a high degree of spatial complexity may include a scene/environment in which many trees and/or a lawn (or other objects with a high amount of detail) are captured. By contrast, frames that capture indoor scenes including walls and furniture may have a relatively lower spatial complexity. To encode a frame having a high degree of spatial complexity while ensuring high quality video, a greater number of bits/bytes may be required than the number of bits/bytes needed to encode a frame with a lower degree of complexity with the same amount of compression being applied for each. "Temporal complexity" is intended to refer to an amount of motion depicted in the video (e.g., in a group of pictures/video frames). In some embodiments, the group of video frames 107 may include a key frame (e.g., key frame 116) and one or more predicted frames (e.g., predicted frame(s) 118). As used herein, a "key frame" refers to a frame in a coded video stream that is coded on its own, while "predicted frames" (or "P frames," for brevity) include frames for which only the differences between the current frame and its reference frame, usually the previous frame, are coded.

Estimating the video complexity of the group of video frames 107 may include calculating the spatial complexity of key frame 116 based at least in part on the quantization parameter value used for compressing the key frame 116, the size of the key frame 116 as compressed, and the maximum frame size corresponding to the quantization parameter value as identified from the mapping 110. Estimating the video complexity of the group of video frames 107 may include calculating the temporal complexity of the group of video frames 107 based at least in part on how many predicted frames are included in the group. In some embodiments, the video complexity score may be adjusted to fall within a range (e.g., 0-100, 0-1, etc.). In the ongoing example, the video complexity score may be adjusted to fall within a range of values 0 to 100.

At 120, a transmission bitrate may be identified based at least in part on a mapping and the video complexity score estimated at 114. A "bitrate" is intended to refer to a number of bits transmitted/streamed per second, represented in units of megabits per second. As a non-limited example, the video complexity (VC) score range within which the video complexity score falls may be identified from the mapping 112 and the corresponding bitrate value may be retrieved.

At 122, the bitrate value identified at 120 may be used to transmit video data from the camera (e.g., to the service provider computer(s) 104). The calculations for estimating the video complexity of the group of video frames 107 require significantly less processing power than the processing power needed for conventional methods of estimating video complexity that employ deep analysis and heavy computation (e.g., discrete cosine transform (DCT), or the like). As a result of this lighter computational burden, the disclosed video complexity estimations may be performed by the camera 102 as part of the video streaming process, enabling the camera 102 to adjust the utilized bitrate according to the complexity of the video, which results in a more efficient use of bandwidth, without sacrificing video quality.

Although the example provided in FIG. 1 utilizes a single group of video frames (e.g., the group of video frames 107, a single group of pictures), it should be appreciated that in some embodiments, any suitable number of video frame groups may be utilized to calculate a video complexity score. In some embodiments, group of video frames 107 may be used to calculate a first video complexity score and a second group of video frames (not depicted) may be used to calculate a second video complexity score. In some cases, the first and second video complexity scores may be averaged or otherwise combined to generate a video complexity score that may be utilized to modify the bitrate used by the camera 102.

As a non-limiting example, the group of video frames 107 may be one group corresponding to a portion (e.g., a two-second portion, a three-second portion, etc.) of a larger video. The larger video may have a finite duration (e.g., 45 seconds, 60 seconds, etc.) and may be captured (e.g., as part of a live viewing action taken by a user, based on motion detection, etc.). As another example, the larger video may be captured as part of a continuous/ongoing feed, of an unknown duration. Any suitable number of groups may be obtained from the video. For a video of a finite duration, some or all of the groups of video frames from the video may be utilized. For a video that is captured as a continuous/ongoing feed, a predetermined number of groups of video frames may be obtained (e.g., 30 consecutive groups of video frames that correspond to a 60-second portion of the video, the groups corresponding to the last 60 seconds of the video, the groups corresponding to the last 30 seconds of the video, etc.). A video complexity score may be calculated for each group of video frames utilized and the resulting video complexity scores may be combined (e.g., averaged, combined based at least in part on weighing the video complexity scores for more recent groups more heavily than the scores of older groups of video frames, etc.) to determine a video complexity score (also referred to as a "combined video complexity score") for the video. The resulting video complexity score may be utilized to modify the bitrate used by the camera 102 for processing and/or streaming subsequently captured video. This process may be performed any suitable number of times to update the video complexity score over time, which may result in ongoing modifications to the bitrate used by the camera 102. It should be appreciated that, in some embodiments, groups of video frames need not be consecutive.

Figure 2B:
FIGS. 2A-2D illustrate a number of video frames depicting exemplary scenes of varying video complexity, in according to at least one embodiment.
Figure 2B:
Figure 2D:
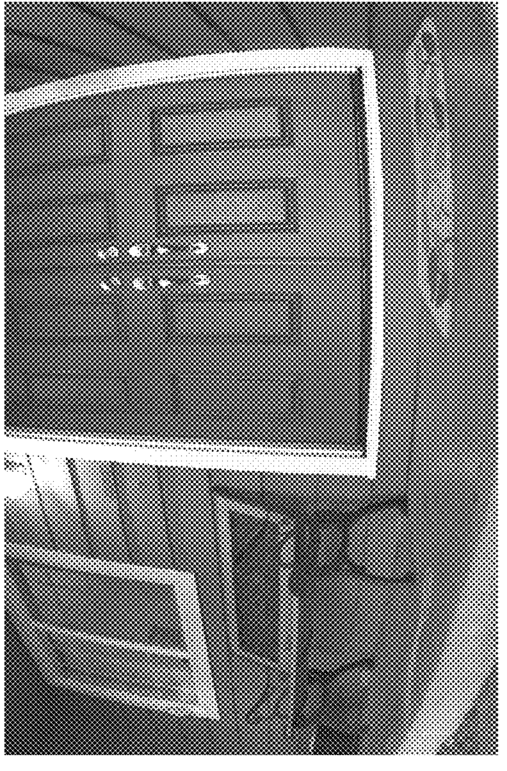
Figure 2A:
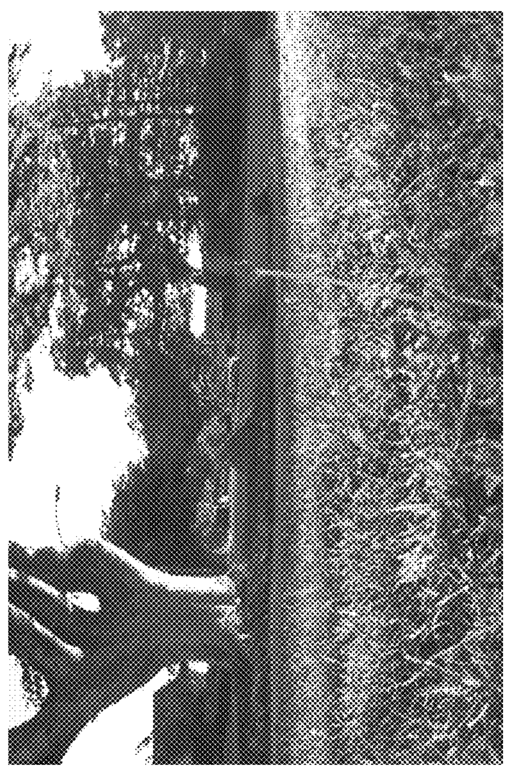
Figure 2C:
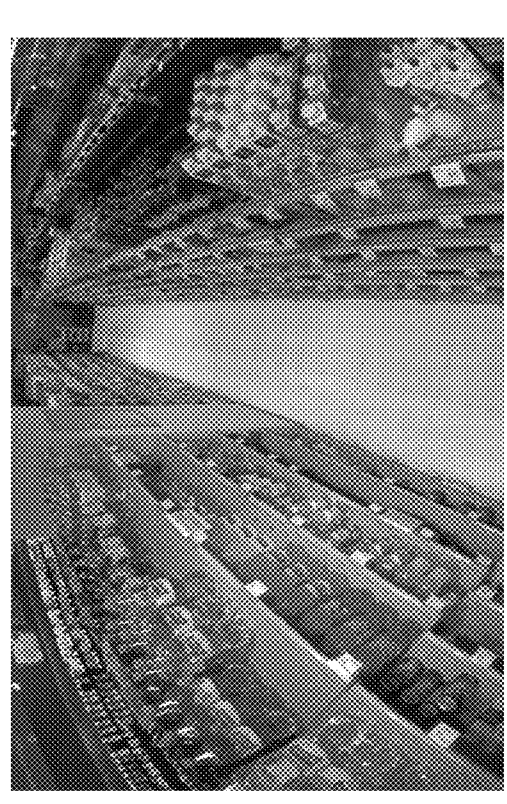

FIGS. 2A-2D illustrate a number of video frames depicting exemplary scenes of varying video complexity, in according to at least one embodiment. FIG. 2A is an example image/video frame depicting a front yard and a high degree of spatially complexity due to the inclusion of many trees, leaves, and blades of grass, among other detailed features. FIG. 2B is an example of an image/video frame having a moderate degree of spatial complexity due to the relatively few fine details and the inclusion of mixed lighting. FIG. 2C is an example image/video frame in which a store aisle is visible. FIG. 2C may be an example of an image/video frame that has a moderately high degree of spatial complexity, though less than the spatial complexity of FIG. 2A. FIG. 2D is an image/video frame including a door/front porch that may be an example of an image/video that has a low degree of video complexity due to the relatively view objects depicted in the image, each having relatively few fine details.

FIGS. 2A-2D are not intended to limit the scope of this disclosure. In some embodiments, the degree of video complexity may be categorized, from highest degree of complexity to lowest, as "highly complex" (e.g., corresponding to FIG. 2A), "complex" (e.g., corresponding to FIG. 2D), "moderately complex" (e.g., corresponding to FIG. 2B), and "simple" (e.g., corresponding to FIG. 2C) based at least in part on the video complexity (VC) of each image. These categories may correspond to the mapping 112 of FIG. 1, in which each video complexity range corresponds to a respective category. For example, a VC score range of 1-10 may correspond to a "simple" video complexity, a VC score range of 11-50 may correspond to a "moderately complex" video complexity, a video score range of 51-75 may correspond to a "complex" video complexity, and a VC score range of 76-100 may correspond to a "highly complex" video complexity. Different range values and/or a different number of ranges may be used in some embodiments, not necessarily the ranges discussed above and depicted in FIGS. 1 and 2A-2D.

Figure 3:
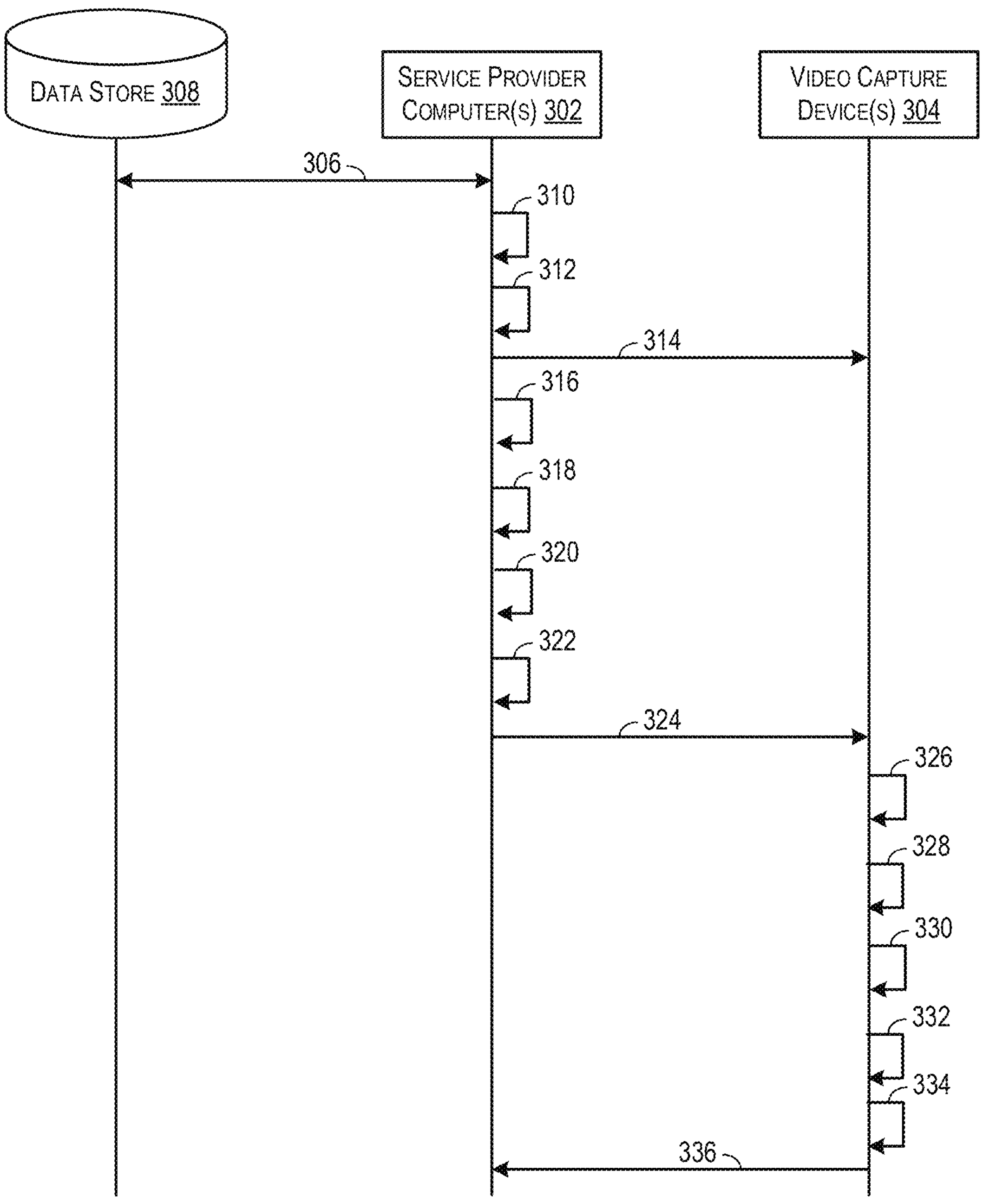
FIG. 3 is a flow diagram that illustrates an exemplary method for determining a streaming bitrate based on an estimated video complexity, in accordance with at least one embodiment.

FIG. 3 is a flow diagram that illustrates an exemplary method for determining a streaming bitrate based on an estimated video complexity, in accordance with at least one embodiment. The operations and interactions described in FIG. 3 may be performed by any suitable combination of the service provider computer(s) 302 (e.g., an example of the service provider computer(s) 104 of FIG. 1) and/or the video capture device(s) 304 (e.g., an example of the camera 102 of FIG. 1).

The method 300 may begin at 306, wherein a collection of images may be retrieved (e.g., by the service provider computer(s) 302 or a different system/device) from data store 308. Data store 308 may include cloud storage hosted by the service provider computer(s) 302, disk storage, local storage, or any suitable storage that is accessible to the service provider computer(s) 302. The images of data store 308 may include any suitable number of groups of images (each an example of the group of video frames 107 of FIG. 1), each group including a key frame and one or more predicted frames. The images (e.g., examples of which may include the frames depicted in FIGS. 2A-2D) may be individually obtained from any suitable number of video capture device(s) 304 (e.g., an example of which includes camera 102 of FIG. 1, smart phones, digital cameras, or the like) at any suitable time. As a non-limiting example, the images obtained from data store 308 may include uncompressed images captured by any suitable image or video capture device (e.g., "capture devices") and transmitted to the service provider computer(s) 302 by any suitable number of capture devices, at any suitable time. In some embodiments, these images may be collected in the usual course of video streaming conducted by the captured devices and stored in data store 308 by the service provider computer(s) 302 for subsequent use. As another example, service provider computer(s) 302 may request a group of video frames (e.g., a group of pictures (GOP)) from each camera (e.g., video capture device(s) 304) at any suitable time. As yet another example, video/groups of images may be uploaded or otherwise stored within data store 308 by a system that is separate from the service provider computer(s) 302. In some embodiments, the images stored within data store 308 may include varying degrees of spatial complexity and/or temporal complexity.

At 310, the service provider computer(s) 302 (or a separate system/device) may encode each of the obtained key frames with a variety of quantization parameter values to produce a set of differently compressed images for each key frame. The service provider computer(s) 302 (or the separate system/device) may generate a table to maintain associations between a given key frame and the size of each compressed version of the key frame given the quantization parameter value that was used for compression. An example of such a table is depicted in FIG. 4.

FIG. 4 depicts a number of exemplary tables/mappings related to maintaining relationships between quantization parameter values and corresponding frame sizes, in accordance with at least one embodiment. Table 400 depicts resulting compressed image size for a given image (a key frame, an image represented by any row of column 402) when compressed using a corresponding quantization parameter (QP) value (individually represented in the populated fields of row 404). As a non-limiting example, row 405 corresponding to a "Backyard" image (e.g., one of the key frames obtained at 306 of method 300, an example of the images depicted in FIGS. 2A-2D, etc.) indicates that the "Backyard" image has a frame size of 314,097 bytes when compressed using a QP value of 22, a frame size of 174,630 bytes when compressed with a QP value of 28, a frame size of 143,228 bytes when compressed with a QP value of 30, a frame size of 100,295 bytes when compressed with a QP value of 33, a frame size of 52,112 bytes when compressed with a QP value of 38, and a frame size of 17,080 bytes when compressed with a QP value of 45. Other rows of the table similarly illustrate example frame sizes of the various key frames when compressed with the QP values depicted in row 404.

The mapping 110 of FIG. 1, illustrated in greater detail via table 406, may be generated from the data of the mapping 400. By way of example, a largest frame size may be identified from the set of frame sizes for each QP value. In the example depicted in FIG. 3, the values of row 408 may be identified as including the largest frame size for each QP value, although the largest frame size does not necessarily correspond to the same image for every QP value in the table in every example. Table 406 (e.g., mapping 110) may be generated to maintain the association between each QP value to the largest/maximum key frame size identified for that QP value. For example, the QP value 22 of column 410 may be associated with a maximum frame size of 549,230 bytes as identified in row 408 of table 400. The association between the QP value 22 and the frame size 549,230 (referred to herein as "a maximum frame size for QP value 22") may be added to table 406 as depicted in row 412 of table 406. A similar process for each column of table 400 may be performed until each of the rows depicted in table 406 are populated. Table 406 (e.g., mapping 110) may then be stored for subsequent use.

Returning to FIG. 3, the operations for generating the table 406 of FIG. 4 (e.g., mapping 110 of FIG. 1) may be performed at 312. The operations described above in connection with FIG. 4 are not repeated here, for brevity. The table 406 (e.g., mapping 110) may be transmitted to the video capture device(s) 304 and stored in local memory at 314, or at any suitable time.

At 316, the service provider computer(s) 302 (or another system or device) may calculate spatial complexity scores for each of the compressed images (e.g., each compressed key frame). A table or other suitable mapping may be generated to maintain the associations between a key frame, a set of QP values, and the spatial complexity score calculated for the key frame when compressed using a given QP value. An example of such a table is depicted in FIG. 5.

FIG. 5 illustrates an exemplary table/mapping (e.g., table 500) depicting associations between spatial complexity (SC) scores for a set of images (e.g., key frames) that have been compressed using a variety of quantization parameter values, in accordance with at least one embodiment. Although table 500 includes fewer columns and fewer corresponding quantization parameter (QP) values than the number depicted in FIG. 4, it should be appreciated that the table 500 may include more, fewer, or the same number of columns/QP values as depicted in the table 400. Table 500 depicts resulting spatial complexity (SC) scores for individual key frames (represented via the rows of column 502) when compressed using a particular quantization parameter (QP) value (represented by columns of row 504). By way of example, row 506 indicates that a spatial complexity score of 53.23 was calculated for the "Backyard" image (the key image corresponding to row 404 of table 4) when compressed with a QP value of 28, a spatial complexity score of 51.77 when compressed with a QP value of 30, a spatial complexity of 50.42 when compressed with a QP value of 32, and a spatial complexity score of 51.77 when compressed with a QP value of 38. Other rows of the table 500 similarly illustrate example a spatial complexity scores for the various key frames when compressed with the QP values of row 504.

In some embodiments, a spatial complexity (SC) score may be calculated based at least in part on the frame size of a compressed key frame, the QP value used for compression, and the maximum frame size identified for that QP value (e.g., the maximum frame size identified in table 406 of FIG. 4). For example, a spatial complexity score may be calculated according to the following exemplary formula:

SC score=given_frame_size(QP)/maximum_frame_size(QP)*100 where the given_frame_size(QP) represents the frame size of the given key frame when compressed with a particular QP value, divided by the maximum_frame_size identified for that same QP value (e.g., from the table 406 of FIG. 4, from mapping 110 of FIG. 1, etc.). The resultant value may be multiplied by 100 (e.g., to cause the score to fall between the range of 0 and 100).

In the ongoing example, the "Outdoors" key frame has the largest compressed frame size regardless of the QP value used for compression, and therefore may be assigned the SC score of 100 for each QP value. A score of 100 indicates that the "Outdoors" key frame represents the most spatially complex image of the set of images represented in table 500.

Returning to FIG. 3, the method 300 may continue to 318, where the service provider computer(s) 302 (or another system or device) may calculate temporal complexity (TC) scores for each group of video frames/images obtained at 306. The amount of motion in a video, quantified by a TC score, can be determined based on the proportion of all predicted frames in a group of video frames (e.g., a group of pictures (GOP)) with respect to the total number of frames in the group of video frames.

FIG. 6 illustrates an exemplary table/mapping (e.g., table 600) that depicts various temporal complexity scores for respective groups of frames corresponding to the key frames identified in the tables of FIGS. 4 and 5, respectively, in accordance with at least one embodiment. Column 602 represents the temporal complexity scores for each video corresponding to the key frame identifiers indicated in column 604.

Returning to FIG. 3, the method 300 may continue to 320, where video complexity (VC) scores may be calculated for each group of video frames.

Figure 7:
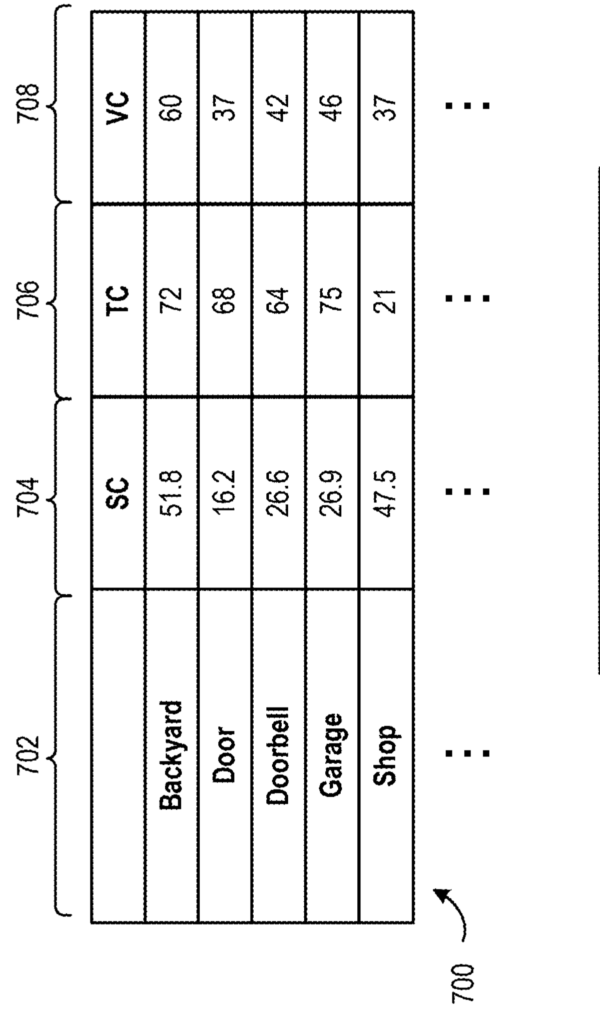
FIG. 7 depicts an exemplary table/mapping depicting various video complexity scores that have been calculated for the video from which the key frames of FIG. 5 and the corresponding predicted frames of FIG. 6 were obtained, in accordance with at least one embodiment.
Figure 7:
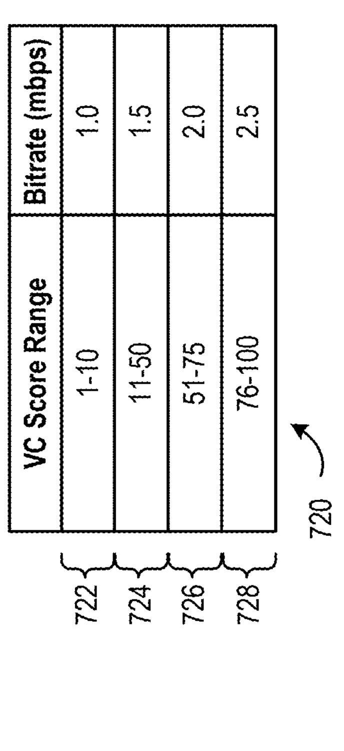

FIG. 7 depicts an exemplary tables/mappings (e.g., table 700) depicting various video complexity (VC) scores calculated for the group of video frames from which the key frames identified in FIGS. 4 and 5 and the corresponding predicted frames of FIG. 6 were obtained, in accordance with at least one embodiment. For brevity, VC scores of a subset of the groups of frames are depicted in FIG. 7. Column 702 identifies the group of video frames (e.g., by key frame identifier). Column 704 identifies the spatial complexity score for a respective group of video frames. Column 706 identifies the temporal complexity score for a respective group of video frames. Column 708 identifies the resulting VC scores for each respective group of video frames.

In some embodiments, a predefined rule set and the VC scores of table 700 may be used to identify a set of VC score ranges that are depicted in table 720. Table 720 may be an example of the mapping 112 of FIG. 1 and may be used to store associations between the VC score ranges and a respective bitrate value. As a non-limiting example, the rule set may specify that the VC scores corresponding to the group of video frames which represent 25% of the total number of groups and the lowest VC scores of the distribution are to be used to determine the first VC score range depicted in row 722.

As a non-limiting example, the service provider computer(s) 302 of FIG. 3 may identify a subgroup representing the lowest VC scores and making up a portion (e.g., 25%) of the total number of VC scores. The value of 1 may be used for the lower limit of the first VC score range and the highest VC score for that subgroup may be identified and used as the upper limit of the first VC score range depicted in row 722.

In some embodiments, the rule set may further specify that the next highest VC scores representing another portion (e.g., a different 25%) of the total number of VC scores may be identified. Once this corresponding subset of VC scores is identified, a lowest VC score of the subset may be assigned as the lower limit of the second VC score range depicted in row 724, and a highest VC score of the subset may be assigned as the upper limit of the second VC score range depicted in row 724.

In some embodiments, the rule set may further specify that the next highest VC scores representing another portion (e.g., another 25%) of the total number of VC scores may be identified. Once this corresponding subset of VC scores is identified, a lowest VC score of the subset may be assigned as the lower limit of the third VC score range depicted in row 726, and a highest VC score of the subset may be assigned as the upper limit of the third VC score range depicted in row 726.

In some embodiments, the rule set may further specify that the highest VC scores representing yet another portion (e.g., yet another 25%) of the total number of VC scores may be identified. Once this corresponding subset of VC scores is identified, a lowest VC score of the subset may be assigned as the lower limit of the fourth VC score range depicted in row 728, and a highest VC score of the subset may be assigned as the upper limit of the fourth VC score range depicted in row 728.

In some embodiments, the rule set may specify the operations for determining a specified number of ranges and respective lower and upper range as well as the operations for assigning a bitrate value to each VC score range. As a non-limiting example, the rule set may indicate that the first VC score range is to be associated with a bitrate of 1.0 megabits per second, the second VC score range is to be associated with a bitrate of 1.5 megabits per second, the third VC score range is to be associated with a bitrate of 2.0 megabits per second, and the fourth VC score range is to be associated with a bitrate of 1.5 megabits per second. These associations may be stored in table 720 for subsequent use.

Returning to FIG. 3, the operations discussed above related to generating table 720 of FIG. 7 may be performed at 322 and are not repeated here, for brevity. The table 720 may be an example of the mapping 112 of FIG. 1. At 324, the table 720 may be transmitted to and stored at the video capture device(s) 304. In some embodiments, once the table/mappings described at 314 and 324 are stored at the video capture device(s) 304, these devices may make subsequent bitrate selections based at least in part on estimating the video complexity of video captured by the device within a threshold amount of time after the video is captured (e.g., under one second, within a few milliseconds, etc.).

At 326, a video capture device of the video capture device(s) 304 may record video and select a group of video frames of the recorded data (e.g., the group of video frames 107 of FIG. 1). As described above in connection with FIG. 1, the video capture device may record video of any suitable duration. The video may be of a finite duration (e.g., a 60-second video, a 10-second video, etc.) or the video may be captured as part of a continuous/ongoing feed. In some embodiments, the video capture device may select more than one group of video frames of the video.

At 328, the video capture device may calculate a spatial complexity (SC) score for the group(s) of video frames. If multiple groups of video frames are utilized, a spatial complexity score may be calculated for each group. In some embodiments, the quantization parameter (QP) value used by an encoder of the video capture device to compress a group of video frames may be identified. At 314, the QP value may be used to look up the maximum frame size from data (e.g., the mapping 110 of FIG. 1, the table 406 of FIG. 4, etc.) stored at the device. The size of the compressed key frame may be identified and used to calculate an SC score. Specifically, an SC score for the key frame may be calculated by taking the size of the key frame as compressed by the encoder of the video capture device using the QP value selected by the encoder, divided by the maximum frame size for that same QP value as identified from the mapping/table stored in local memory (e.g., the mapping 110, the table 406, etc.).

At 330, the video capture device may calculate a temporal complexity (TC) score for the group(s) of video frames. If multiple groups of video frames are utilized, a TC score may be calculated for each group. In some embodiments, the number of predicted frames in a group of video frames may be divided by the total number of frames in the group to calculate the TC score for that group of video frames.

At 332, the video capture device may calculate a video complexity (VC) score for the group(s) of video frames. If multiple groups of video frames are utilized, a VC score may be calculated for each group. In some embodiments, the SC score calculated at 328 and the TC score calculated at 330 may be used to calculate the VC score for the group of video frames. In some embodiments, the SC score may be weighted differently than the TC score and, in some embodiments, may be weighted to cause a greater impact on the resulting VC score. As a non-limiting example, a VC score may be calculated based on the following formula:

$$\text{VC Score}=\text{SC\_Score}*W1+\text{TC\_Score}*W2$$

where W1 represents a first weight value (e.g., 0.6) and W2 represents a second weight value (e.g., 0.4). For example, when W1 is equal to 0.6 and W2 is equal to 0.4, the SC score will be factored more heavily than the TC score when determining the VC score. Specifically, the SC score will account for 60% of the VC score, while the TC score will account for 40% of the VC score.

In embodiments in which multiple VC scores are calculated (each corresponding to a different group of video frames, each VC score may be used to calculate a VC score for the video (also referred to as a "combined VC score"). By way of example, any suitable number of VC scores corresponding to any suitable number of consecutive groups of video frames may be added together and the resultant value may be divided by the number of groups utilized. This may provide a combined VC score that represents an average of all of the VC scores corresponding to each group. In some embodiments, the VC scores may be combined using a weighting scheme that causes VC scores for more recently groups of video frames to be weighted more heavily than the VC scores corresponding to groups of video frames that were captured earlier. By combining multiple VC scores, confidence in the estimated video complexity of the video may be increased, reducing the risk that unnecessary bitrate modifications occur due to seemingly outlier complexity estimations.

At 334, the video capture device may utilize the VC score to determine from the mapping/table stored at 324 (e.g., the mapping 112 of FIG. 1, the table 720 of FIG. 7, etc.) a VC score range to which the VC score corresponds. The bitrate value corresponding to the VC score range and VC score may be selected and utilized by the video capture device to stream subsequent video to the service provider computer(s) at 336. In some embodiments, the bitrate value selected may be a maximum bitrate that may be used by the video capture device to record video. In some embodiments, the selected bitrate value may be modified over time and may be selected based at least in part on additional factors including, but not limited to the available bandwidth to the video capture device to stream video to a content management system (e.g., a cloud based content management system), whether the video capture device is battery operated, the current power level of the device and the like. As a non-limiting example, a lower bitrate value may be selected when the video capture device is battery operated than would otherwise be selected when the video capture device is wired to a power source.

Although the operations and data described at 314 and 324-332 are depicted and described as being performed by video capture device(s) 304 (or at least one video capture device of device(s) 304), it should be appreciated that the service provider computer(s) 302 may additionally or alternatively perform any suitable combination of those operations. For example, the group of video frames and QP value used to encode the images may be transmitted/streamed to service provider computer(s) 302, which may store mappings 110 and 112 (e.g., tables 406 and 720) at any suitable storage location (e.g., local memory, data store 308, etc.). The service provider computer(s) 302 may calculate the SC score, the TC score, and/or the VC score as described at 326-330 and may identify and select a bitrate value in a similar manner as described at 332 and 334, respectively. Although not depicted, the service provider computer(s) 302 in this example may be configured to transmit the selected bitrate value to the video capture device from which the group of video frames was captured. The video capture device may be configured to utilize the provided bitrate for subsequent video processing and/or streaming.

The operations described above (e.g., at 306-334) may be performed any suitable number of times, at or for any suitable number of video capture devices, at any suitable frequency, according to a predefined schedule, and/or on demand to perform ongoing and real time bitrate adjustments at and/or by one or more video capture devices.

Figure 8:
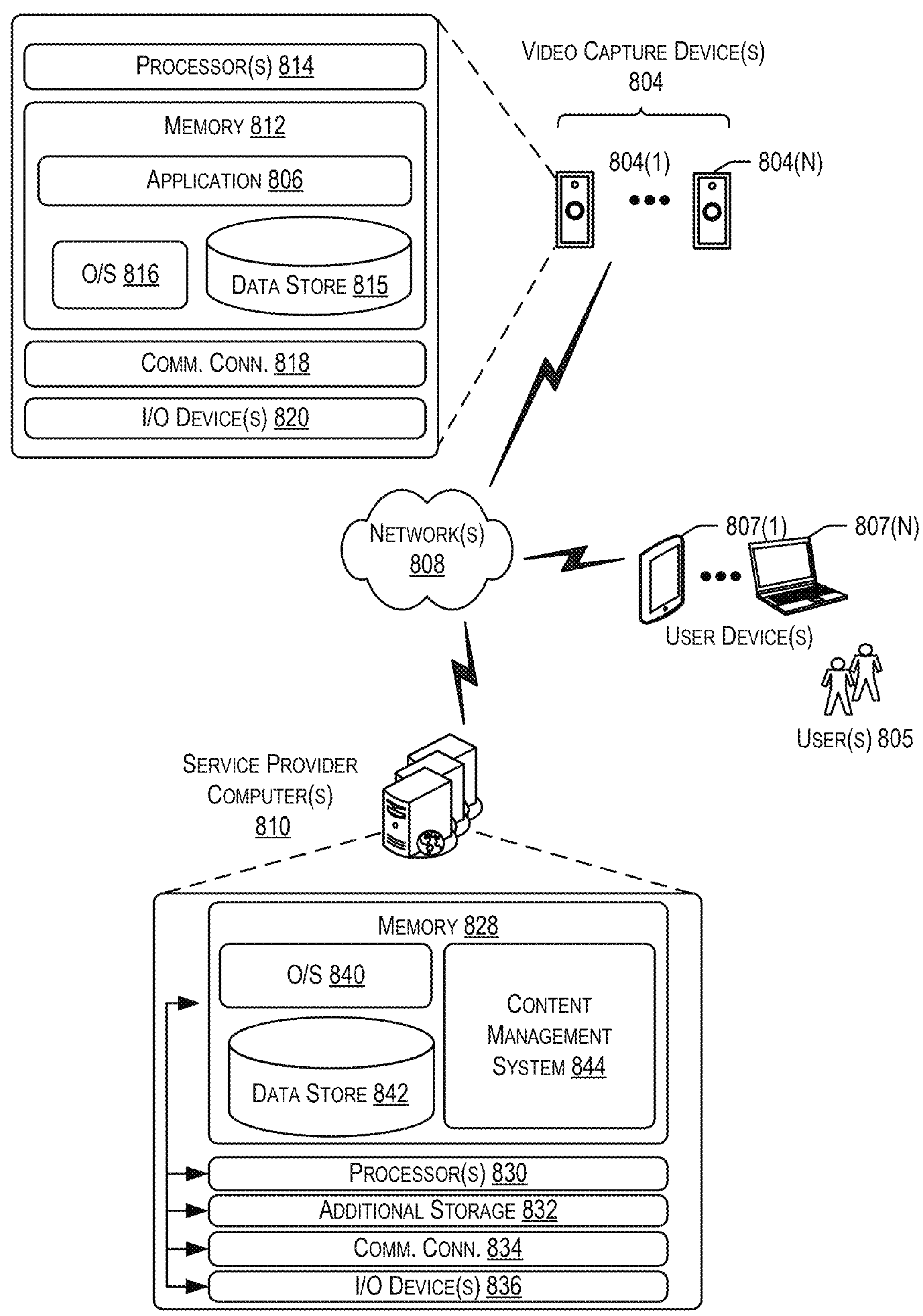
FIG. 8 illustrates components of a system, including a content management system that may perform functions, in accordance with at least one embodiment.

FIG. 8 illustrates components of a system 800, including a content management system 844, in accordance with at least one embodiment. In system 800, video capture device(s) 804 (e.g., security cameras, a deployed fleet of cameras, etc.) may be used to capture respective videos. The video capture device(s) 804 (an example of the camera 102 of FIG. 1) may be configured to provide video content via one or more networks 808. By way of example, the video capture device(s) 804 may stream or otherwise transmit captured video to the service provider computer(s) 810 via networks 808. In some embodiments, the application 806 (or other program code) executing on the video capture device(s) 804 may provide content that can be hosted, managed, and/or provided by a computing resources service or service provider, such as by utilizing one or more service provider computer(s) 810 (e.g., examples of the service provider computer(s) 104 of FIG. 1). Content stored by the service provider computer(s) 810 may be made accessible to user(s) 805 via user device(s) 807. User device(s) 807 may communicate with service provider computer(s) 810 to enable content interactions via networks 808. The user(s) 805 may be provided various graphical user interface elements at user device(s) 807 with which to view content provided by service provider computer(s) 810 (e.g., via a web browser or application not depicted here). In some embodiments, user input provided via these user interfaces may be transmitted to the content management system 844, implemented by service provider computer(s) 810 to interact with this content (e.g., to view the content, to delete the content, etc.).

In some examples, the networks 808 may include any one or a combination of many different types of networks, such as cable networks, the Internet, wireless networks, cellular networks, and other private and/or public networks. While the illustrated example represents the video capture device(s) 804, user device(s) 807, and service provider computer(s) 810 interact over the networks 808, the described techniques may equally apply in instances where any suitable combination of these devices interact over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 810, perhaps arranged in a cluster of servers or as a server farm, may host an application operating on the user device(s) 807 and/or cloud-based software services. Other server architectures may also be used to host the application and/or cloud-based software services. The application operating at the user device(s) 807 (e.g., a web browser, a security camera viewing application, a video streaming application, etc.) operating on the user device(s) 807 may be capable of handling requests from the user(s) 805 and serving, in response, various user interfaces that can be rendered at the user device(s) 807. The application operating on the user device(s) 807 can present any suitable type of interface that supports user interaction, including viewing video streams in real-time or viewing/deleting previously recorded videos, etc.

The user device(s) 807 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 807 may be in communication with the service provider computer(s) 810 via the networks 808, or via other network connections.

In one illustrative configuration, the video capture device(s) 804 may include at least one memory 812 and one or more processing units (e.g., processor(s) 814). The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described. The processor(s) 814 may include a WiFi system-on-a-chip (SOC) processor and may be utilized as part of an integrated circuit that includes the processor(s), memory, communication components (e.g., communication radios/antennas such as communications connection(s) 818).

The memory 812 may store program instructions that are loadable and executable on the processor(s) 814, as well as data generated during the execution of these programs. Depending on the configuration and type of user computing device, the memory 812 may be volatile (such as random-access memory (RAM)) and/or non-volatile (such as read-only memory (ROM), flash memory, etc.). The video capture device(s) 804 may also include additional removable storage and/or non-removable storage including, but not limited to, flash storage, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random-access memory (SRAM), dynamic random-access memory (DRAM), electrically erasable programming ROM (EEPROM), flash memory, cache, or ROM.

Turning to the contents of the memory 812 in more detail, the memory 812 may include an operating system 816, one or more data stores 815, and one or more application programs, modules, or services for implementing the techniques disclosed herein, provided via the application 806. The application 806 may be configured to receive, store, and/or display a network page or other interface for interacting with the service provider computer(s) 810. Additionally, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The video capture device(s) 804 may also contain communications connection(s) 818 that allow the video capture device(s) 804 to communicate with a stored database, another computing device or server (e.g., the service provider computer(s) 810), user terminals and/or other devices on the networks 808. The video capture device(s) 804 may also include I/O device(s) 820, such as a camera, a keyboard, a mouse, a pen, a button, a voice input device, a touch input device, a display, speakers, etc. I/O device(s) 820 may include one or more video encoders that include a device or software program that is configured to compress video to a digital format that can be streamed (e.g., steamed to the service provider computer(s) 810). The video encoder(s) may obtain uncompressed video signal from a camera and compress it using a compression algorithm (e.g., a codec) to reduce the amount of data needed to convey the same information while preserving its quality. The level of compression may be indicated by a quantization parameter value that may be selected by the encoder based on known techniques. In some embodiments, the video encoder(s) may provide the current quantization parameter (QP) value and frame size (e.g., a compressed key frame size) to any suitable component of the video capture device(s) 804 such as processor(s) 814. Processor(s) 814 may be configured to perform operations of the application 806 for estimating video complexity of the video captured by video capture device(s) 804 utilizing the techniques and method disclosed herein, including utilizing the QP value and/or compressed key frame size to estimate the complexity of captured video. A bitrate may be selected and utilized by video capture device(s) 804 for subsequent video processing/transmitting/streaming based on the estimated complexity as described herein.

In some embodiments, the service provider computer(s) 810 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 810 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 810 may be in communication with the video capture device(s) 804, and/or user device(s) 807, and/or other service providers via the networks 808 or via other network connections. The service provider computer(s) 810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 810 may include at least one memory 828 and one or more processing units (e.g., processor(s) 830). The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computer(s) 810, the memory 828 may be volatile (such as RAM) and/or non-volatile (such as ROM, flash memory, etc.). The service provider computer(s) 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile, or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 810 may also contain communications connection(s) 734 that allow the service provider computer(s) 810 to communicate with a stored database, another computing device or server, user terminals and/or other devices on the networks 808. The service provider computer(s) 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services (e.g., the content management system 844) for implementing at least some of the features disclosed herein. In some embodiments, the operations performed as described with respect to generating/calculating the data of FIGS. 4-7 may be performed by any suitable combination of video capture device(s) 804 and/or service provider computer(s) 810.

Figure 9:
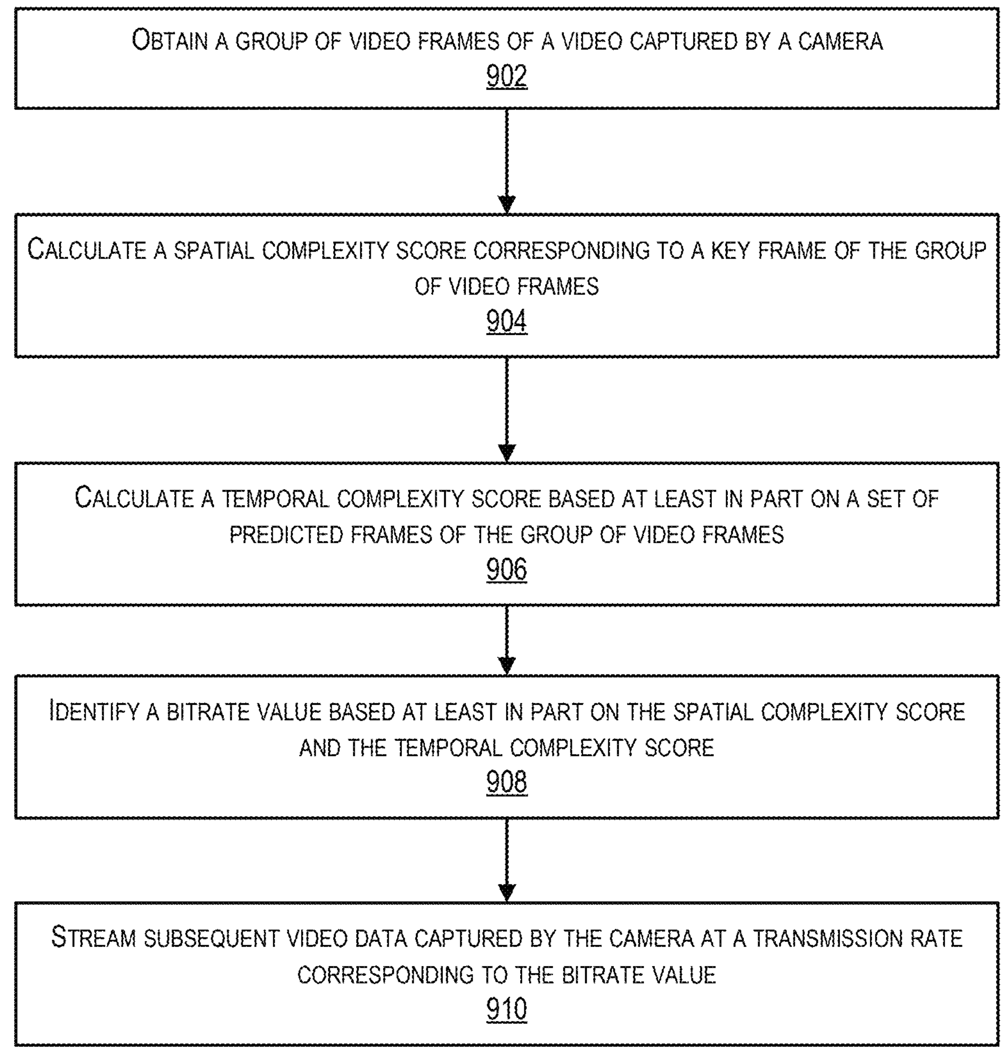
FIG. 9 is a flowchart illustrating an example method for selecting a bitrate for video streaming based on a video complexity estimation, in accordance with at least one embodiment.

FIG. 9 is a flowchart illustrating an example method 900 for selecting a bitrate for camera transmission based on a video complexity estimation, in accordance with at least one embodiment. A computing device comprising one or more processors and one or more computer-readable mediums (e.g., one or more memories) may be utilized. A computer-readable medium may store computer-executable instructions that, when executed by at least one processor, causes the computing device(s) to execute the operations of the method 900. It should be appreciated that the operations of the method 900 may be performed in any suitable order, not necessarily the order depicted in FIG. 9. Further, the method 900 may include additional, or fewer operations than those depicted in FIG. 9. In some embodiments, the operations of method 900 may be performed by any suitable combination of the video capture device(s) 804 of FIG. 8 (e.g., the camera of FIG. 1, the video capture device(s) 304 of FIG. 3, etc.) and/or the service provider computer(s) 810 of FIG. 8.

The method 900 may begin at 902, where a group of video frames of a video (e.g., group of video frames 107 of FIG. 1) may be captured by a camera (e.g., camera 102). As described above, the group of video frames may include one key frame and any suitable number of predicted frames. In some embodiments, the camera may be configured to stream video to a content management system.

At 904, a spatial complexity score corresponding to a key frame of the group of video frames may be calculated. In some embodiments, the spatial complexity score (e.g., the spatial complexity score calculated at 328 of FIG. 3) may correspond to a key frame of the group of video frames.

At 906, a temporal complexity score (e.g., the temporal complexity score calculated at 330 of FIG. 3) may be calculated based at least in part on a set of predicted frames of the group of video frames. By way of example, the number of predicted frames may be divided by the total number of frames in the group of video frames and the resultant value may be multiplied by 100 to cause the value to fall between the values of 0 and 100.

At 908, a bitrate value may be identified from a predefined mapping (e.g., mapping 112 of FIG. 1, table 720 of FIG. 7) based at least in part on the spatial complexity score and the temporal complexity score. By way of example, the spatial complexity score and the temporal complexity score may be used to calculate a video complexity score as described in connection with FIG. 3 at 332. The video complexity score may be used to look up within the predefined mapping, the bitrate corresponding to the video complexity score (that falls within a respective video complexity score range of the mapping).

At 910, subsequent video data captured by the camera may be stream or otherwise transmitted at a rate corresponding to the bitrate value.

The operations of the method 900 (as well as method 300 of FIG. 3) may be performed any suitable number of times to provide ongoing bitrate selections. If the spatial complexity of subsequent video captured by the camera and/or the temporal complexity of subsequent video were to increase, a higher bitrate may be selected and employed. Conversely, if the spatial complexity of the subsequent video captured by the camera and/or the temporal complexity of the video were to decrease, a lower bitrate may be selected and employed.

Figure 10:
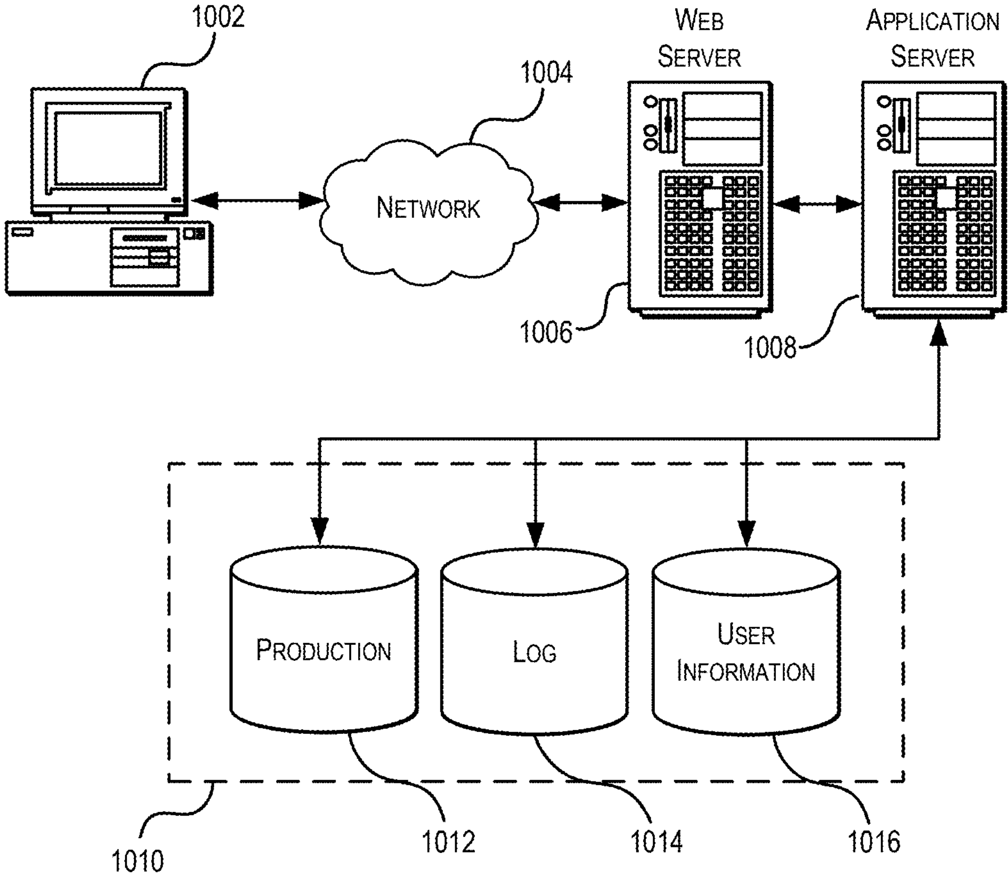
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes a user device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

obtaining, by a processor of a video capture device, a first mapping that maps a plurality of video complexity score ranges to corresponding bitrates;

obtaining, by the processor, a second mapping that maps a plurality of compression parameter values to a corresponding plurality of maximum frame sizes;

obtaining, by the processor, a group of video frames of a video;

identifying, by the processor, a key frame of the group of video frames, one or more predicted frames of the group of video frames, and a total number of frames in the group of video frames;

determining, by the processor, a key frame size and a compression parameter value used by the video capture device for compression;

calculating a video complexity score for the group of video frames, the video complexity score being calculated based at least in part on a spatial complexity score that indicates a degree of detail depicted within the key frame and a temporal complexity score that indicates an amount of motion depicted with the group of video frames, the temporal complexity score being calculated based at least in part on a quantity of the one or more predicted frames and the total number of video frames in the group of video frames; and assigning, by the processor, a bitrate to be used by the processor for transmitting subsequent video, the bitrate being determined based at least in part on the first mapping and the video complexity score for the group of video frames.

2. The computer-implemented method of claim 1, wherein the compression parameter value is obtained from a video encoder of the video capture device.

3. The computer-implemented method of claim 1, wherein the second mapping is generated based at least in part on:

obtaining a plurality of key frames having varying degrees of spatial complexity;

generating, from the plurality of key frames, a plurality of compressed key frames based at least in part on respective compression parameter values;

identifying a plurality of key frame sizes corresponding to the plurality of compressed key frames;

identifying a largest key frame size of the plurality of key frame sizes; and storing, within the second mapping, an association between the largest key frame size and the compression parameter value.

4. The computer-implemented method of claim 1, further comprising:

calculating video complexity scores corresponding to different groups of video frames;

determining the video complexity score ranges based at least in part on a distribution of the video complexity scores corresponding to different groups of video frames;

storing the video complexity score ranges in the first mapping; and assigning a corresponding bitrate to each of the video complexity score ranges within the first mapping.

5. The computer-implemented method of claim 1, wherein assigning the bitrate to be used by the processor for transmitting subsequent video causes the processor to stream the subsequent video at a rate corresponding to the bitrate assigned.

6. A computing device, comprising:

one or more processors; and one or more memories storing computer-executable instructions that, when executed by the one or more processors, cause the one or more processors to:

obtain a group of video frames of a video captured by a camera;

calculate a video complexity score based at least in part on the group of video frames, the video complexity score being calculated based at least in part on a spatial complexity score corresponding to a key frame of the group of video frames and a temporal complexity score corresponding to predicted frames of the group of video frames, the temporal complexity score being calculated based at least in part on a quantity of predicted frames of the group of video frames and a total number of video frames in the group of video frames;

obtain a mapping that maps a plurality of video complexity scores to corresponding bitrate values; and adjust a streaming bitrate used by the camera to stream video data to a bitrate value that is identified from the mapping, the bitrate value being identified based at least in part on the video complexity score for the group of video frames.

7. The computing device of claim 6, wherein executing the computer-executable instructions that causes the one or more processors to calculate the video complexity score and adjust the streaming bitrate of the camera is performed in real time.

8. The computing device of claim 6, wherein executing the computer-executable instructions that causes the one or more processors to calculate the spatial complexity score corresponding to the key frame of the group of video frames, further causes the one or more processors to:

identify a quantization parameter value used to compress the key frame and a size of the key frame as compressed; and determine, from a second mapping, a maximum key frame size that is associated with the quantization parameter value, wherein the spatial complexity score corresponding to the key frame is calculated based at least in part on the size of the key frame as compressed, the quantization parameter value, and the maximum key frame size that is associated with the quantization parameter value.

9. The computing device of claim 8, wherein the second mapping has been previously generated by a separate computing device different from the computing device and stored in the one or more memories of the computing device prior to capture of the group of video frames.

10. The computing device of claim 6, wherein the mapping associates a highest bitrate value to a highest video complexity score range and a lowest bitrate value to a lowest video complexity score range.

11. The computing device of claim 6, wherein the video complexity score is calculated further based at least in part on a second spatial complexity score corresponding to a second key frame of a second group of video frames and a second temporal complexity score corresponding to second predicted frames of the second group of video frames.

12. A computer-readable storage medium comprising computer-executable instructions that, when executed by one or more processors of a computing device, cause the one or more processors to:

obtain a group of video frames of a video captured by a camera;

calculate a spatial complexity score corresponding to a key frame of the group of video frames;

calculate a temporal complexity score based at least in part on a quantity of predicted frames in a set of predicted frames of the group of video frames and a total number of video frames in the group of video frames;

identify, from a mapping, a bitrate value based at least in part on the spatial complexity score and the temporal complexity score; and stream subsequent video data captured by the camera at a transmission rate corresponding to the bitrate value.

13. The computer-readable storage medium of claim 12, wherein executing the computer-executable instructions that causes the one or more processors to identify the bitrate value, further causes the one or more processors to:

calculate a video complexity score for the group of video frames based at least in part on the spatial complexity score and the temporal complexity score, wherein identifying the bitrate value is identified from the mapping based at least in part on the video complexity score for the group of video frames.

14. The computer-readable storage medium of claim 12, wherein the spatial complexity score is calculated based at least in part on a maximum key frame size corresponding to a quantization parameter value used to encode the key frame.

15. The computer-readable storage medium of claim 14, wherein the maximum key frame size for the quantization parameter value is determined based at least in part on a plurality of key frame sizes corresponding to a plurality of key frames captured by a plurality of cameras.

16. The computer-readable storage medium of claim 12, wherein executing the computer-executable instructions further causes the one or more processors to:

obtain a second group of video frames subsequently captured by the camera;

calculate a second spatial complexity score corresponding to a second key frame of the second group of video frames;

calculate a second temporal complexity score based at least in part on a second set of predicted frames of the second group of video frames;

identify, from the mapping, a second bitrate value based at least in part on the second spatial complexity score and the second temporal complexity score; and adjust the transmission rate of the camera to a value corresponding to the second bitrate value.

17. The computer-readable storage medium of claim 12, wherein executing the computer-executable instructions further causes the one or more processors to:

prior to identifying the bitrate value, obtain a second group of video frames subsequently captured by the camera;

calculate a second spatial complexity score corresponding to a second key frame of the second group of video frames;

calculate a second temporal complexity score based at least in part on a second set of predicted frames of the second group of video frames;

wherein the bitrate value is identified further based at least in part on the second spatial complexity score and the second temporal complexity score.

18. The computer-readable storage medium of claim 16, wherein the spatial complexity score is a first spatial complexity score, wherein the first spatial complexity score is calculated based at least in part on a first quantization parameter value utilized by the camera for encoding during a first time period, wherein the second spatial complexity score is calculated based at least in part on a second quantization parameter value utilized by the camera for encoding during a second time period, wherein the first spatial complexity score and the second spatial complexity score indicate a common degree of spatial complexity, and wherein the first quantization parameter value differs from the second quantization parameter value.

* * * * *